US012769170B2

(12) United States Patent
Tsai et al.

(10) Patent No.: US 12,769,170 B2
(45) Date of Patent: Oct. 20, 2026

(54) DISPLAY WITH RECESSED SOURCE-DRAIN CONTACTS

(71) Applicant: Innolux Corporation, Miaoli County (TW)

(72) Inventors: Chia-Hao Tsai, Miaoli County (TW); Ming-Jou Tai, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 361 days.

(21) Appl. No.: 18/409,728

(22) Filed: Jan. 10, 2024

(65) Prior Publication Data

US 2024/0280868 A1 Aug. 22, 2024

Related U.S. Application Data

(60) Provisional application No. 63/447,349, filed on Feb. 22, 2023.

(30) Foreign Application Priority Data

Nov. 15, 2023 (CN) ......................... 202311522267.2

(51) Int. Cl.
*G02F 1/1362* (2006.01)
*G02F 1/1368* (2006.01)

(52) U.S. Cl.
CPC .... *G02F 1/136286* (2013.01); *G02F 1/13685* (2021.01)

(58) Field of Classification Search
CPC ........................ G02F 1/136286; G02F 1/13685
See application file for complete search history.

(56) References Cited

U.S. PATENT DOCUMENTS

2019/0146293 A1* 5/2019 Xue ...................... G02F 1/1368 257/72

FOREIGN PATENT DOCUMENTS

CN 105824160 6/2020

* cited by examiner

*Primary Examiner* — J. E. Schoenholtz
(74) *Attorney, Agent, or Firm* — JCIPRNET

(57) ABSTRACT

An electronic device including a substrate, a first insulating layer, a semiconductor layer, a second insulating layer and a data line is provided. The first insulation layer is disposed on the substrate. The semiconductor layer is disposed on the first insulating layer. The second insulating layer is disposed on the semiconductor layer and has a first hole. The data line is disposed on the substrate, and the data line is electrically connected to the semiconductor layer through the first hole. Corresponding to an edge of the semiconductor layer, the first insulating layer has a recess.

19 Claims, 14 Drawing Sheets

DISPLAY WITH RECESSED SOURCE-DRAIN CONTACTS

CROSS-REFERENCE TO RELATED APPLICATION

This application claims the priority benefit of U.S. provisional application Ser. No. 63/447,349, filed on Feb. 22, 2023 and China application serial no. 202311522267.2, filed on Nov. 15, 2023. The entirety of each of the above-mentioned patent applications is hereby incorporated by reference herein and made a part of this specification.

BACKGROUND

Technical Field

The disclosure relates to an electronic device, and particularly relates to a display device.

Description of Related Art

In order to enable a display device to have a high resolution (such as a virtual reality display device), pixels therein are designed to have a relatively small size. Therefore, when using an etching stop layer to form holes in the pixels, if a process deviation occurs, a film layer not covered by the etching stop layer may be removed, causing rupture of the film layer and probably lead to problems of open circuits and/or short circuits between the subsequent formed wiring and/or electrodes. Therefore, a yield of the display device will be reduced.

SUMMARY

Some embodiments of the disclosure are directed to an electronic device with relatively good yield.

Some embodiments of the disclosure provide an electronic device including a substrate, a first insulating layer, a semiconductor layer, a second insulating layer and a data line. The first insulating layer is disposed on the substrate. The semiconductor layer is disposed on the first insulating layer. The second insulating layer is disposed on the semiconductor layer and has a first hole. The data line is disposed on the substrate, and the data line is electrically connected to the semiconductor layer through the first hole. Corresponding to an edge of the semiconductor layer, the first insulating layer has a recess.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
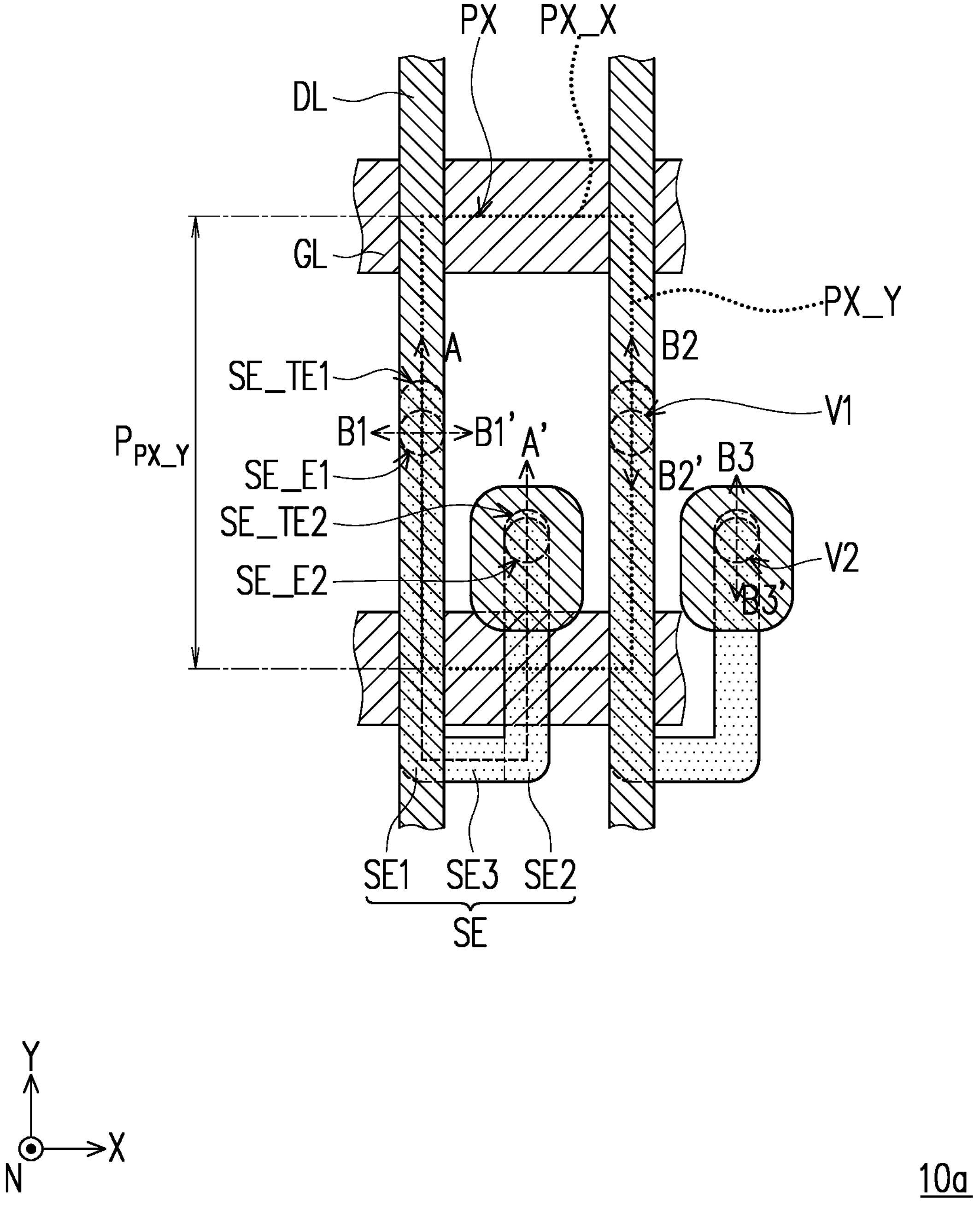
FIG. 1 is a schematic partial top view of an electronic device according to a first embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

The disclosure may be understood by referring to the following detailed description in conjunction with the accompanying drawings. It should be noted that, in order to achieve easy understanding of the readers and concise of the drawings, the drawings in the disclosure only depict a part of an electronic device, and specific elements in the drawings are not drawn to actual scales. In addition, the number and size of each element in the figures are for illustration only, and are not intended to limit the scope of the disclosure.

Certain terms are used throughout the specification of the disclosure and the appended claims to refer to specific components. Those skilled in the art should understand that electronic device manufacturers may probably use different names to refer to the same components. This specification is not intended to distinguish between components that have the same function but different names. In the following specification and claims, the terms “including”, “containing”, “having”, etc., are open terms, so that they should be interpreted as meaning of “including but not limited to . . . ”. Therefore, when the terms “including”, “containing”, and/or “having” are used in the description of the disclosure, they specify existence of corresponding features, regions, steps, operations, and/or components, but do not exclude existence of one or more corresponding features, regions, steps, operations, and/or components.

Directional terminology mentioned in the specification, such as “top”, “bottom”, “front”, “back”, “left”, “right”, etc., is used with reference to the orientation of the figures being described. Therefore, the used directional terminology is only illustrative, and is not intended to be limiting of the disclosure. In the figures, the drawings illustrate general characteristics of methods, structures, and/or materials used in specific embodiments. However, these drawings should not be construed as defining or limiting of a scope or nature covered by these embodiments. For example, for clarity's sake, a relative size, a thickness and a location of each film layer, area and/or structure may be reduced or enlarged.

When a corresponding component (for example, a film layer or an area) is referred to be "on another component", the component may be directly located on the another component, or other components probably exist there between. On the other hand, when a component is referred to be "directly on another component", none other component exits there between. Moreover, when a component is referred to be "on another component", the two components have an up-down relationship in a top view, and this component may be above or below the another component, and the up-down relationship depends on an orientation of the device.

The terms "about", "equal to", "equivalent" or "identical", "substantially" or "approximately" are generally interpreted as being within a range of 20% of a given value or range, or as being within a range of 10%, 5%, 3%, 2%, 1%, or 0.5% of the given value or range.

The ordinal numbers used in the specification and claims, such as "first", "second", etc., are used to modify components, and do not imply and represent the component or these components have any previous ordinal numbers, and do not represent a sequence of one component with another, or a sequence in a manufacturing method. The use of these ordinal numbers is only to make a clear distinction between a component with a certain name and another component with the same name. The same terms may not be used in the claims and the specification, and accordingly, a first component in the specification may be a second component in the claims.

It should be noted that, in the following embodiments, the features of several different embodiments may be replaced, reorganized, and mixed to complete other embodiments without departing from the spirit of the disclosure. As long as the features of the various embodiments do not violate the spirit of the disclosure or conflict with each other, they may be mixed and matched arbitrarily.

The electrical connection or electric connection described in this disclosure may refer to direct connection or indirect connection. In the case of direct connection, terminals of components on two circuits are directly connected or connected to each other by means of a conductor line segment, and in the case of direct connection, there are switches, diodes, capacitors, inductors, other suitable components, or combinations of the above components between the terminals of the components on the two circuits, but the disclosure is not limited thereto.

In the disclosure, the thickness, length, width and area may be measured by using an optical microscope, and the thickness may be measured based on a cross-sectional image in an electron microscope, but the disclosure is not limited thereto. In addition, any two values or directions used for comparison may have a certain error. If a first value is equal to a second value, it implies that there may be an error of about 10% between the first value and the second value; if a first direction is perpendicular to a second direction, then an angle between the first direction and the second direction may be between 80 degrees to 100 degrees; if the first direction is parallel to the second direction, the angle between the first direction and the second direction may be between 0 degree and 10 degrees.

The electronic device disclosed herein may be applied to display devices, light-emitting devices, backlighting devices, virtual reality devices, augmented reality devices, antenna devices, sensing devices, or splicing devices, but the disclosure is not limited thereto. The electronic device may be a bendable or flexible electronic device. The electronic device may include, for example, liquid crystal, light-emitting diodes, fluorescence, phosphor, other suitable display media, or a combination of the above, but the disclosure is not limited thereto. The display device may be a non-self-luminous display device or a self-luminous display device. The antenna device may be a liquid crystal type antenna device or a non-liquid crystal type antenna device, and the sensing device may be a sensing device that senses capacitance, light, heat energy or ultrasonic waves, but the disclosure is not limited thereto. The electronic device may include, for example, passive components and active components, such as capacitors, resistors, inductors, diodes, transistors, etc. The diodes may include light-emitting diodes or photodiodes. The light-emitting diodes may include, for example, organic light-emitting diodes (OLEDs), mini LEDs, micro LEDs or quantum dot LEDs. dot LED), but the disclosure is not limited thereto. The splicing device may be, for example, a display splicing device or an antenna splicing device, but the disclosure is not limited thereto. It should be noted that the electronic device may be any combination of the above, but the disclosure is not limited thereto. In addition, a shape of the electronic device may be a rectangular shape, a circular shape, a polygonal shape, a shape with curved edges, or other suitable shapes. The electronic device may have a peripheral system such as a driving system, a control system, a light source system, etc., to support the display device, the antenna device, the wearable device (for example, including augmented reality or virtual reality), a vehicle-mounted device (for example, including a car windshield), or the splicing device.

Figure 2:
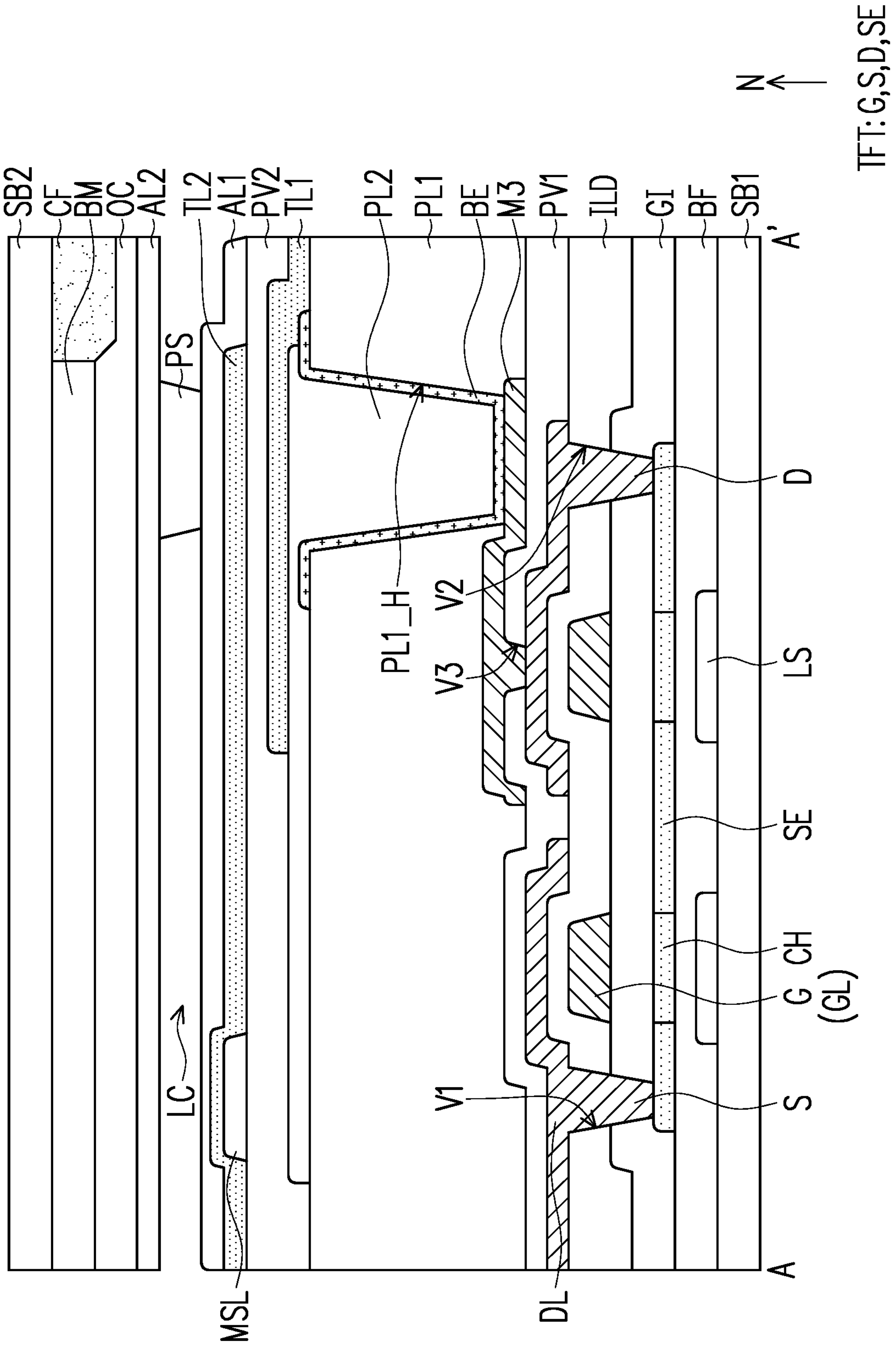
FIG. 2 is a schematic partial cross-sectional view of an embodiment based on a cross-section line A-A' of FIG. 1.

FIG. 1 is a schematic partial top view of an electronic device according to a first embodiment of the disclosure, and FIG. 2 is a schematic partial cross-sectional view of an embodiment based on a cross-section line A-A' of FIG. 1.

Referring to FIG. 1 and FIG. 2 at the same time, an electronic device 10*a* of the embodiment includes a substrate SB1, an insulating layer BF, a semiconductor layer SE, and data lines DL. In some embodiments, the electronic device 10*a* of the embodiment further includes an active component TFT, a gate insulating layer GI, an interlayer insulating layer ILD, gate lines GL, a light-shielding layer LS, an insulating layer PV1, a conductive layer M3, and a planarization layer PL1, a bridge electrode BE, a planarization layer PL2, a transparent conductive layer TL1, an insulating layer PV2, a light-shielding layer MSL, a transparent conductive layer TL2, a substrate SB2, a light-shielding layer BM, a display medium layer LC and a supporter PS.

The substrate SB1 may be, for example, a flexible substrate or a non-flexible substrate. In some embodiments, a material of the substrate SB1 may include glass, plastic, or a combination thereof. For example, the material of the substrate SB1 may include quartz, sapphire, polymethyl methacrylate (PMMA), polycarbonate (PC), polyimide (PI), polyethylene terephthalate (PET) or other suitable materials or combinations of the above materials, which is not limited by the disclosure.

The insulating layer BF is, for example, disposed on the substrate SB1. The insulating layer BF may, for example, have a relatively good bonding property with a subsequent film layer formed thereon, but the disclosure is not limited thereto. A material of the insulating layer BF may be, for example, an inorganic material (for example, silicon oxide, silicon nitride, silicon oxynitride or a stacked layer of at least two of the above materials). In some embodiments, the insulating layer BF may have a single-layer structure or a multi-layer structure, but the disclosure is not limited thereto.

The active component TFT is, for example, disposed on the substrate SB1. In the embodiment, the active component TFT is disposed on the buffer layer BF. In some embodiments, the active component TFT may include a gate G, a source S, a drain D, and the above-mentioned semiconductor layer SE, but the disclosure is not limited thereto. The gate G may, for example, at least partially overlap the semiconductor layer SE in a normal direction N of the substrate SB, where a region where the semiconductor layer SE overlaps the gate G may be regarded as a channel region CH. In some embodiments, a gate insulating layer GI is disposed between the gate G and the semiconductor layer SE. The source S and the drain D are, for example, separated from each other, and are electrically connected to the semiconductor layer SE respectively. In some embodiments, a material of the semiconductor layer SE may include amorphous silicon, low temperature polycrystalline silicon (LTPS), metal oxide, other suitable materials, or combinations thereof, where the metal oxide may include indium gallium zinc oxide (IGZO), but the disclosure is not limited thereto. In some embodiments, the interlayer insulating layer ILD and the gate insulating layer GI are disposed between the source S (or drain D) and the semiconductor layer SE, where a hole V1 and a hole V2 penetrating through the interlayer insulating layer ILD and the gate insulating layer GI are formed. The hole V1 and the hole V2 respectively expose a part of the semiconductor layer SE (i.e., the source region and the drain region), and the source S and the drain D are respectively connected with the source region and the drain region of the semiconductor layer SE through the hole V1 and the hole V2, but the disclosure is not limited thereto. Materials of the gate insulating layer GI and the interlayer insulating layer ILD may be, for example, inorganic materials (such as silicon oxide, silicon nitride, silicon oxynitride or stacked layers of at least two of the above materials), but the disclosure is not limited thereto. In some embodiments, the gate insulating layer GI and/or the interlayer insulating layer ILD may be a single-layer structure or a multi-layer structure. It should be noted that although the active component TFT in the embodiment is a top gate type thin film transistor, the disclosure is not limited thereto.

Figure 3A:
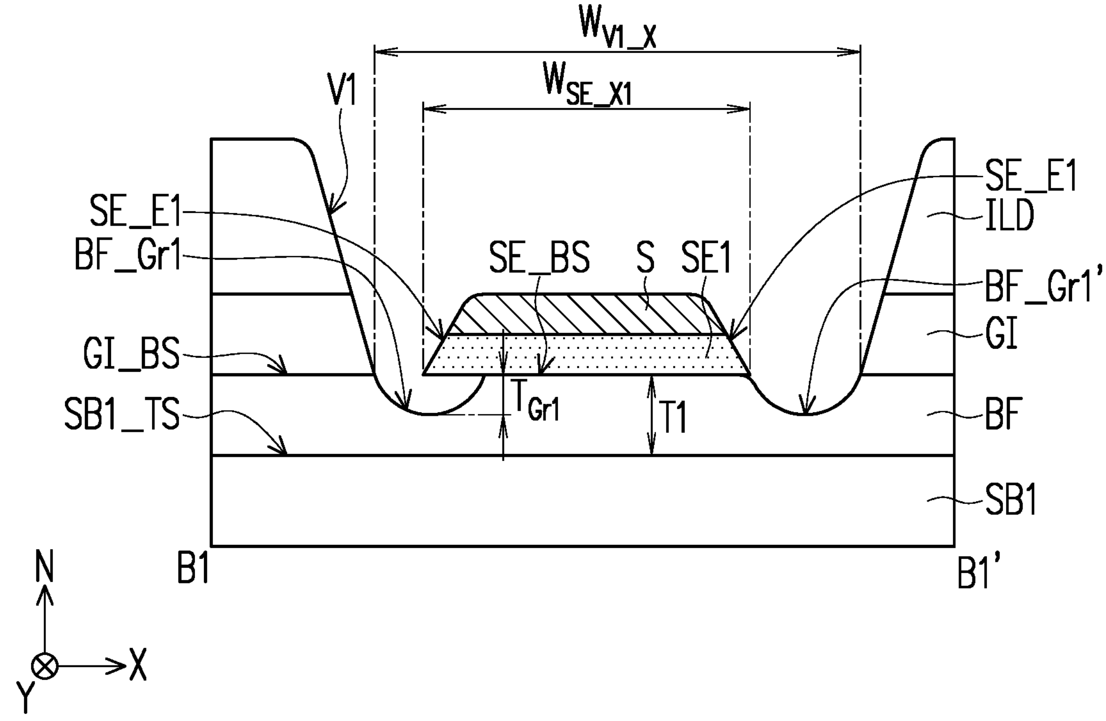
FIG. 3A is a schematic partial cross-sectional view of an embodiment based on a cross-section line B1-B1' of FIG. 1.
Figure 3B:
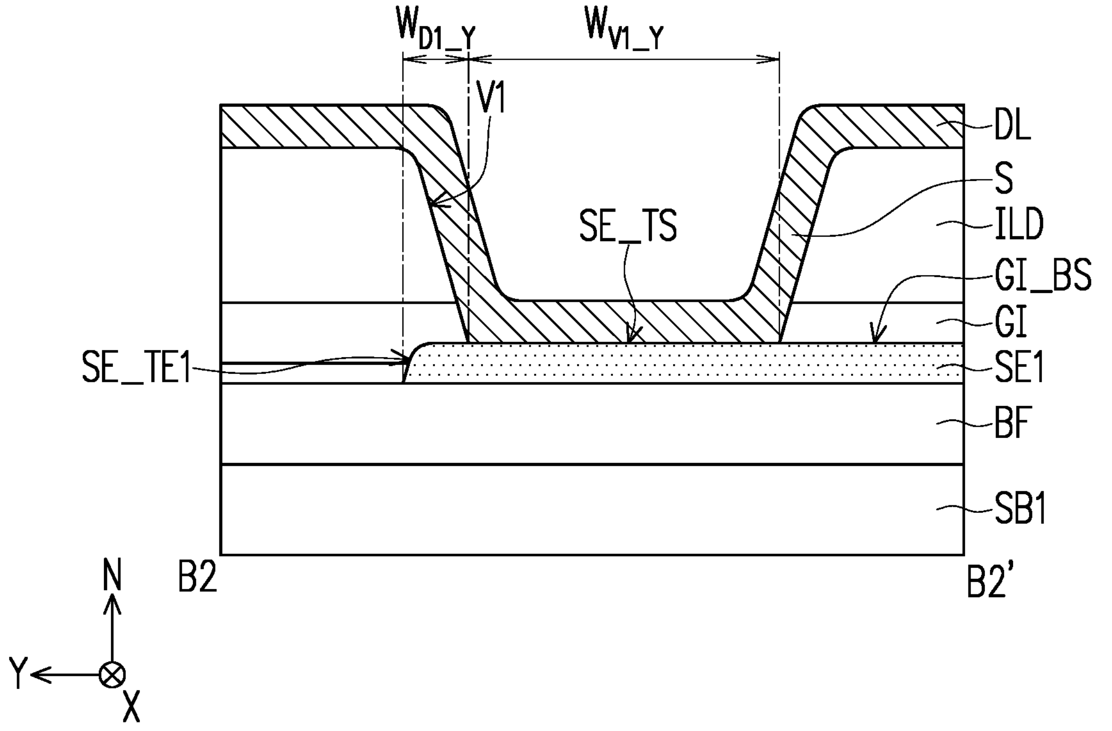
FIG. 3B is a schematic partial cross-sectional view of an embodiment based on a cross-section line B2-B2' of FIG. 1.
Figure 3C:
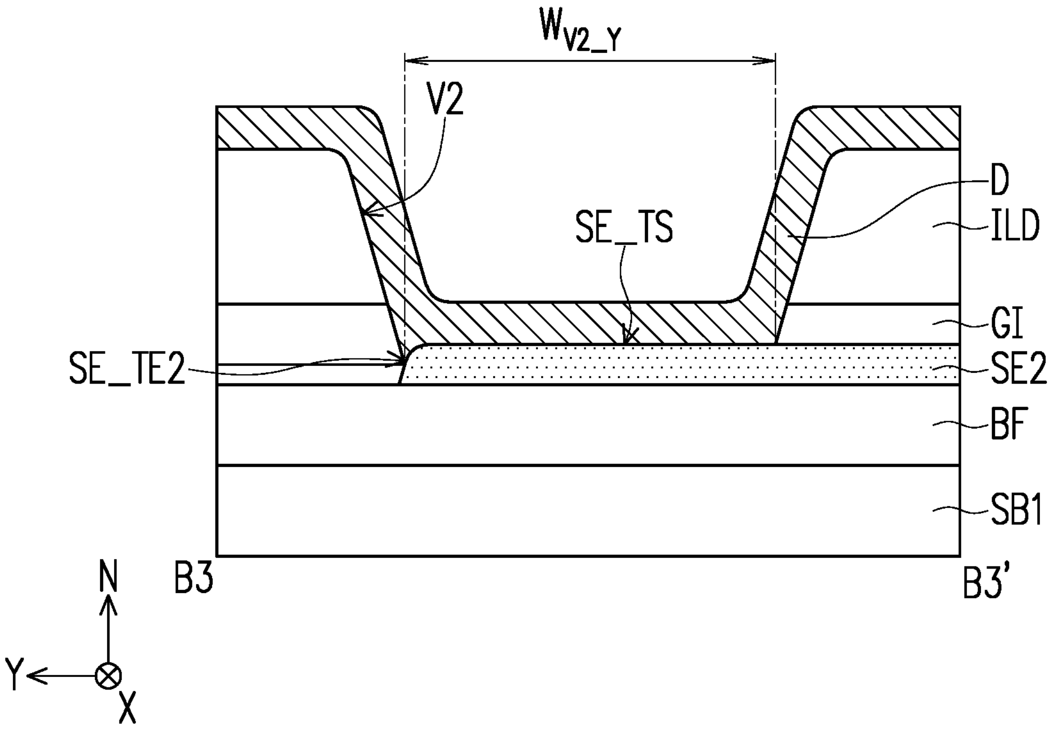
FIG. 3C is a schematic partial cross-sectional view of an embodiment based on a cross-section line B3-B3' of FIG. 1.

FIG. 3A is a schematic partial cross-sectional view of an embodiment based on a cross-section line B1-B1' of FIG. 1, FIG. 3B is a schematic partial cross-sectional view of an embodiment based on a cross-section line B2-B2' of FIG. 1, and FIG. 3C is a schematic partial cross-sectional view of an embodiment based on a cross-section line B3-B3' of FIG. 1.

Referring to FIG. 3A, in some embodiments, corresponding to an edge SE_E1 of the semiconductor layer SE, the insulating layer BF has a recess BF_Gr1. The edge SE_E1 here means an outer edge portion of the semiconductor layer SE corresponding to the hole V1 in the normal direction N of the substrate SB1. The reason why the insulating layer BF has the recess BF_Gr1 may be, for example, the following reasons, but the disclosure is not limited thereto. For example, when the semiconductor layer SE is used as the etching stop layer to form the hole V1, an edge of a part of an outline of the hole V1 may exceed the edge SE_E1 of the semiconductor layer SE in the normal direction N of the substrate SB1, so that a part of the insulating layer BF is also removed during the formation of the hole V1. Therefore, the insulating layer BF may have the recess BF_Gr1. In the embodiment, the recess BF_Gr1 at least partially overlaps the hole V1 in the normal direction N of the substrate SB1. Therefore, when viewing in a plan view direction of the electronic device 10*a* (opposite to the normal direction N of the substrate SB1), the hole V1 exposes a part of the edge SE_E1 of the semiconductor layer SE.

In some embodiments, the recess BF_Gr1 of the insulating layer BF overlaps with the edge SE_E1 of the semiconductor layer SE. In detail, the recess BF_Gr1 of the insulating layer BF, for example, overlaps with a part of an outline of the edge SE_E1 of the semiconductor layer SE in the normal direction N of the substrate SB1, so that the semiconductor layer SE may expose a part of the recess BF_Gr1 in the normal direction N of the substrate SB1. Namely, a part of the recess BF_Gr1 overlaps with the semiconductor layer SE, and another part of the recess BF_Gr1 does not overlap with the semiconductor layer SE.

From another perspective, in a specific direction perpendicular to the normal direction N of the substrate SB1, a width $W_{SE\_X1}$ of the semiconductor layer SE corresponding to the hole V1 is smaller than a width $W_{V1\_X}$ of the hole V1.

A relationship between the size of the hole V1, the size of the semiconductor layer SE located in the hole V1, and the size of the recess BF_Gr1 of the insulating layer BF will be described in detail in the following embodiment.

In some embodiments, the recess BF_Gr1 of the insulating layer BF has a minimum thickness $T_{Gr1}$, and a lower surface SE_BS of the semiconductor layer SE (or a lower surface GI_BS of the gate insulating layer GI) has a first distance T1 from an upper surface SB1_TS of the substrate SB1 (i.e., a thickness of the insulating layer BF in the normal direction N of the substrate SB1). In detail, the recess BF_Gr1 of the insulating layer BF does not expose the upper surface SB1_TS of the substrate SB1. Therefore, the minimum thickness $T_{Gr1}$ of the recess BF_Gr1 of the insulating layer BF is smaller than the first distance T1.

In some embodiments, the insulating layer BF may further include a recess BF_Gr1', where the recess BF_Gr1' at least partially overlaps the hole V1 in the normal direction N of the substrate SB1, but the recess BF_Gr1' does not overlap with the edge SE_E1 of the semiconductor layer SE. In detail, the recess BF_Gr1' of the insulating layer BF, for example, does not overlap with a part of the outline of the edge SE_E1 of the semiconductor layer SE in the normal direction N of the substrate SB1, so that the semiconductor layer SE may expose all of the recesses BF_Gr1' in the normal direction N of the substrate SB1. In addition, in the embodiment, a minimum thickness $T_{Gr1'}$ of the recess BF_Gr1' of the insulating layer BF is also smaller than the first distance T1, which will not be repeated.

Referring to FIG. 1 again, the gate lines GL are, for example, disposed on the substrate SB1. In some embodiments, the gate lines GL are disposed on the gate insulating layer GI and extend along the direction X. The gate G in the active component TFT may, for example, be electrically connected to the corresponding gate line GL to receive a corresponding gate signal. In some embodiments, a material of the gate line GL may include molybdenum (Mo), titanium (Ti), tantalum (Ta), niobium (Nb), hafnium (Hf), nickel (Ni), chromium (Cr), cobalt (Co), zirconium (Zr), tungsten (W), aluminum (Al), copper (Cu), silver (Ag), other suitable metals, or alloys or combinations of the above materials, which is not limited by the disclosure.

The data lines DL are, for example, disposed on the substrate SB1. In some embodiments, the data lines DL are disposed on the interlayer insulating layer ILD and extend along a direction Y, where the direction Y is different from the direction X. In the embodiment, the direction Y is perpendicular to the direction X, but the disclosure is not limited thereto. The source S of the active component TFT may be, for example, electrically connected to the corresponding data line DL to receive a corresponding data signal. In some embodiments, a material of the data line DL may also include molybdenum (Mo), titanium (Ti), tantalum (Ta), niobium (Nb), hafnium (Hf), nickel (Ni), chromium (Cr), cobalt (Co), zirconium (Zr), tungsten (W), aluminum (Al), copper (Cu), silver (Ag), other suitable metals, or alloys or combinations of the above materials, which is not limited by the disclosure. The data line DL and the gate line GL may, for example, include the same or different materials, and the disclosure is not limited thereto.

In the embodiment, the data line DL is electrically connected to the semiconductor layer SE through the hole V1. In detail, the hole V1 penetrates through the interlayer insulating layer ILD and the gate insulating layer G, and exposes a part of the semiconductor layer SE (i.e., the source region). Therefore, the data line DL may be electrically connected to the semiconductor layer SE through the source S and the hole V1.

In the embodiment, two adjacent gate lines GL and two adjacent data lines DL may define one sub-pixel structure PX of the electronic device 10*a*, where the sub-pixel structure PX may include a long side PX_Y extending in the direction Y and a short side PX_X extending in the direction X, but the disclosure is not limited thereto.

In the embodiment, the semiconductor layer SE includes a semiconductor part SE1, a semiconductor part SE2 and a semiconductor part SE3, where the semiconductor part SE3 connects the semiconductor part SE1 and the semiconductor part SE2. The semiconductor part SE1 and the semiconductor part SE2, for example, extend in the direction Y, and the semiconductor part SE3, for example, extends in the direction X. In some embodiments, a length of the semiconductor part SE in the direction Y is greater than a length of the semiconductor part SE2 in the direction Y, but the disclosure is not limited thereto.

Referring to FIG. 3A, in some embodiments, in the direction X, the width $W_{SE\_X1}$ of the semiconductor part SE1 corresponding to the hole V1 is smaller than the width $W_{V1\_X}$ of the hole V1. Namely, as shown in FIG. 3A, the size of the semiconductor part SE1 in the direction X is, for example, smaller than the size of the hole V1 in the direction X, so that the formed hole V1 exposes the insulating layer BF below the semiconductor part SE1 in the direction X. Relatively, the semiconductor part SE1 may be configured in the direction X (the extending direction of the short side PX_X of the sub-pixel structure PX) to have a relatively small size. Therefore, the electronic device 10*a* of the embodiment may include sub-pixel structures PX with a relatively small size to achieve high resolution.

In the embodiment, the width $W_{SE\_X1}$ of the semiconductor part SE1 corresponding to the hole V1 and the Width $W_{V1\_X}$ of the hole V1 satisfies a following relational expression: $(W_{V1\_X}-W_{SE\_X1})/2<0.5*W_{V1\_X}$, where a difference between the width $W_{V1\_X}$ and the width $W_{SE\_X1}$ may be regarded as a width of the recess BF_GR1 of a part of the insulating layer BF exposed by the semiconductor part SE1 in the direction X, but the disclosure is not limited thereto. By making the width $W_{SE\_X1}$ of the semiconductor part SE1 corresponding to the hole V1 and the width $W_{V1\_X}$ of the hole V1 satisfy the above relational expression, the electronic device 10*a* of the embodiment may include the sub-pixel structures PX with a relatively small size and achieve a high resolution without affecting the operation of the active component TFT.

It should be noted that the width $W_{SE\_X1}$ of the semiconductor part SE1 may be, for example, defined by the minimum width of the lower surface SE_BS of the semiconductor part SE1 in the direction X, and the width $W_{V1\_X}$ of the hole V1 may be defined, for example, by a width of a bottom of the hole in the direction X, but the disclosure is not limited thereto.

Referring to FIG. 3B, in the embodiment, in the direction Y, a distance $W_{D1\_Y}$ between an upper edge SE_TE1 of the semiconductor layer SE and the hole V1 and the width $W_{V1\_Y}$ of the hole V1 satisfy a following relational expression: $0.1*W_{V1\_Y}\leq W_{D1\_Y}<0.5*P_{PX\_Y}$, where the distance $W_{DL\_Y}$ may be regarded as a size of a part of the semiconductor part SE1 close to the upper edge $S_{E\_TE1}$ in the direction Y and not exposed by the hole V1, and $P_{PX\_Y}$ may be regarded as a size (length) of the long side PX_Y of the sub-pixel structure PX, but the disclosure is not limited thereto. The upper edge SE_TE1 of the semiconductor layer SE here is, for example, an arc-shaped edge of one end of the semiconductor part SE1 away from the semiconductor part SE3. Namely, as shown in FIG. 3B, the semiconductor part SE1 has a portion that is not exposed by the hole V1 in the direction Y, so that the semiconductor part SE1 may be configured in the direction Y (the extending direction of the long side PX_Y of the sub-pixel structure PX) to have a relatively large size, which may reduce the possibility that the formed hole V1 exposes the insulating layer BF in the direction Y, thereby reducing the problem of the source S in the hole V1 being open-circuited or being short-circuited with the light-shielding layer LS. In addition, by making the distance $W_{D1\_Y}$ (the size of the part of the semiconductor part SE1 close to the upper edge SE_TE1 in the direction Y and not exposed by the hole V1) smaller than the size of the long side PX_Y of the sub-pixel structure PX, the electronic device 10*a* of the embodiment may include the sub-pixel structures PX with a relatively small size and achieve a high resolution without affecting the operation of the active component TFT.

It is should be noted that the distance $W_{D1\_Y}$ between the upper edge SE_TE1 of the semiconductor layer SE and the hole V1 may, for example, be defined by the minimum width of the upper surface SE_TS of the semiconductor part SE1 close to the upper edge SE_TE1 which is not exposed by the hole V1 in the direction Y, the width $W_{V1\_Y}$ of the hole V1 may be, for example, defined by the width of the hole bottom in the direction Y, and the length $P_{PX\_Y}$ may be, for example, defined by a pitch between edges of a same side of two adjacent gate lines GL (or centers of the two adjacent gate lines GL) in the direction Y, but the disclosure is not limited thereto.

Referring to FIG. 3C, in the embodiment, in the direction Y, the upper edge SE_TE2 of the semiconductor layer SE may exactly overlap with an outline of a part of the hole V2, so that the hole V2 does not expose the insulating layer BF in the direction Y, thereby reducing the problem that the drain D formed in the hole V2 is open-circuited or is short-circuited with the light-shielding layer LS. The upper edge SE_TE2 of the semiconductor layer SE here is, for example, an arc-shaped edge of one end of the semiconductor part SE2 away from the semiconductor part SE3. However, the disclosure is not limited thereto. Namely, the semiconductor part SE2 may also have a portion not exposed by the hole V2 in the direction Y, where the upper edge SE_TE2 of the semiconductor layer SE may also have a distance from the hole V2, and the distance and a width $W_{V2\_Y}$ of the hole V2 may also satisfy the above relational expression ($0.1*W_{V1\_Y} \leq W_{D1\_Y} < 0.5*P_{PX\_Y}$), but the disclosure is not limited thereto.

It should be noted that the width $W_{V2\_Y}$ of the hole V2 may be defined, for example, by the width of a bottom of the hole in the direction Y, but the disclosure is not limited thereto.

Referring to FIG. 2, the light-shielding layer LS is, for example, disposed on the substrate SB1. In the embodiment, the light-shielding layer LS is disposed between the substrate SB1 and the semiconductor layer SE of the active component TFT. In detail, the light-shielding layer LS may be, for example, disposed between the substrate SB and the channel region CH of the semiconductor layer SE in the normal direction N of the substrate SB1, but the disclosure is not limited thereto. The light-shielding layer LS, for example, at least partially overlaps the channel region CH of the semiconductor layer SE in the normal direction N of the substrate SB1, thereby mitigating deterioration of the channel region CH due to exposure to external ambient light. In some embodiments, the light-shielding layer LS may include materials with relatively low reflectivity and low transmittance. For example, the light-shielding layer LS may include photoresist, ink, resin, colorants, metals and their oxides or other organic materials, or other suitable materials or combinations thereof. In some embodiments, the reflectivity of the light-shielding layer LS may be greater than or equal to 0% and less than 70%, but the disclosure is not limited thereto.

The insulating layer PV1 is, for example, disposed on the active component TFT. In the embodiment, the insulating layer PV1 covers the source S of the active component TFT and partially covers the drain D, i.e., the insulating layer PV1 has a hole V3 that exposes a part of the drain D, but the disclosure is not limited thereto. A material of the insulating layer PV1 may include, for example, inorganic materials (such as silicon oxide, silicon nitride, silicon oxynitride or stacked layers of at least two of the above materials), organic materials (such as polyimide resin, epoxy resin or acrylic resin) or a combination of the above, but the disclosure is not limited thereto.

The conductive layer M3 is, for example, disposed on the insulating layer PV1. In the embodiment, the conductive layer M3 is electrically connected to the drain D of the active component TFT through the hole V3 of the insulating layer PV1. In some embodiments, the conductive layer M3 may be used to electrically connect the active component TFT and the transparent conductive layer TL1 that will be introduced later, but the disclosure is not limited thereto. A material of the conductive layer M3 may include metal, metal oxide, other suitable materials or combinations thereof, and the disclosure is not limited thereto. In some embodiments, configuration of the conductive layer M3 may be omitted, i.e., the drain D of the active component TFT may be directly electrically connected to the transparent conductive layer TL1.

The planarization layer PL1 is, for example, disposed on the insulating layer PV1 and partially covers the conductive layer M3. Viewed from another perspective, the planarization layer PL1 may, for example, include a hole PL1_H exposing a part of the conductive layer M3. A material of the planarization layer PL1 may be, for example, an organic insulating material, but the disclosure is not limited thereto. In the embodiment, the planarization layer PL1 may have a relatively flat top surface, so that subsequent film layers formed thereon may have a relatively good yield.

The bridge electrode BE is, for example, disposed on the planarization layer PL1. In the embodiment, the bridge electrode BE is disposed in the hole PL1_H of the planarization layer PL1 and is electrically connected to the conductive layer M3. In some embodiments, the bridge electrode BE and the above-mentioned conductive layer M3 may be used together to electrically connect the active component TFT and the transparent conductive layer TL1 that will be introduced later, but the disclosure is not limited thereto. A material of the bridge electrode BE may, for example, include metal oxide conductive materials (for example: indium tin oxide, indium zinc oxide, aluminum tin oxide, aluminum zinc oxide, indium germanium zinc oxide), but the disclosure is not limited thereto.

The planarization layer PL2 is, for example, disposed on the planarization layer PL1. In the embodiment, the planarization layer PL2 is filled in the hole PL1_H of the planarization layer PL1 and covers the bridge electrode BE disposed in the hole PL1_H of the planarization layer PL1, but the disclosure is not limited thereto. In addition, in the embodiment, the planarization layer PL2 exposes a part of the bridge electrode BE that is not disposed in the hole PL1_H of the planarization layer PL1, so that the bridge electrode BE may be electrically connected to the transparent conductive layer TL1 that will be introduced later. A material of the planarization layer PL2 may be, for example, an organic insulating material, but the disclosure is not limited thereto. In the embodiment, the planarization layer PL2 may have a relatively flat top surface, so that subsequent film layers formed thereon have a relatively good yield. In some embodiments, the planarization layer PL2 may overlap the gate line GL and/or the light-shielding layer LS in the normal direction N of the substrate SB.

The transparent conductive layer TL1 is, for example, disposed on the planarization layer PL2. In the embodiment, the transparent conductive layer TL1 is electrically connected to the bridge electrode BE exposed by the planarization layer PL2, and may be used as a pixel electrode, but the disclosure is not limited thereto. A material of the transparent conductive layer TL1 may, for example, include metal oxide conductive materials (for example: indium tin oxide, indium zinc oxide, aluminum tin oxide, aluminum zinc oxide, indium germanium zinc oxide), but the disclosure is not limited thereto.

The insulating layer PV2 is, for example, disposed on the transparent conductive layer TL1 and covers the transparent conductive layer TL1. A material of the insulating layer PV2 may include, for example, inorganic materials (such as silicon oxide, silicon nitride, silicon oxynitride or a stacked layer of at least two of the above materials), organic materials (such as polyimide resin, epoxy resin or acrylic resin) or a combination of the above, but the disclosure is not limited thereto.

The light-shielding layer MSL is, for example, disposed on the insulating layer PV2. In the embodiment, the light-shielding layer MSL is disposed on the data lines DL and overlaps the data lines DL, but the disclosure is not limited thereto. In detail, the light-shielding layer MSL, for example, overlaps the data lines DL in the normal direction N of the substrate SB. In some embodiments, a material of the light-shielding layer MSL may include low-reflectivity metal, a metal oxide material, or a black resin organic material (BM). Based on this, the light-shielding layer MSL may, for example, reduce a color mixing phenomenon of different colors of light emitted by adjacent sub-pixel structures PX and the reflected light of data lines, so as to improve color mixing and contrast effects of the electronic device 10*a* under wide viewing angles.

The transparent conductive layer TL2 is, for example, disposed on the insulating layer PV2, and may at least partially cover the light-shielding layer MSL, thereby reducing the possibility of contamination in the electronic device and improving process feasibility. In the embodiment, the transparent conductive layer TL2 is electrically connected to the light-shielding layer MSL and may be used as a common electrode, but the disclosure is not limited thereto. A material of the transparent conductive layer TL2 may, for example, include metal oxide conductive materials (for example: indium tin oxide, indium zinc oxide, aluminum tin oxide, aluminum zinc oxide, indium germanium zinc oxide), but the disclosure is not limited thereto. It should be noted that in other embodiments, the light-shielding layer MSL may be disposed above the transparent conductive layer TL2, i.e., the light-shielding layer MSL may at least partially cover the transparent conductive layer TL2, which may further reduce light reflection and improve display contrast. In some embodiments, the transparent conductive layer TL2 is disposed on the data lines DL and may have slits (not shown), but the disclosure is not limited thereto.

The substrate SB2 is, for example, disposed opposite to the substrate SB1. A material of the substrate SB2 may be the same as or similar to the material of the substrate SB1, which will not be repeated.

The light-shielding layer BM and a color filter CF are, for example, disposed on the substrate SB2. In the embodiment, the light-shielding layer BM and the color filter CF are, for example, respectively disposed on a surface of the substrate SB2 facing the substrate SB1, but the disclosure is not limited thereto. In some embodiments, a material of the light-shielding layer BM may include black resin, but the disclosure is not limited thereto. In other embodiments, the material of the light-shielding layer BM may include a metal material with low reflectivity. Based on this, the light-shielding layer BM may be used, for example, to shield components and wiring inside the electronic device 10*a* that are not intended to be seen by the user, so as to improve a display effect of the electronic device 10*a*. The color filter CF may include, for example, a red filter pattern, a green filter pattern, or a blue filter pattern, thereby allowing the electronic device 10*a* to have a color display screen, but the disclosure is not limited thereto.

The display medium LC is, for example, disposed between the substrate SB1 and the substrate SB2. In detail, the display medium layer LC is, for example, disposed between the light-shielding layer MSL and the light-shielding layer BM. In the embodiment, a material of the display medium layer LC includes liquid crystal molecules. In some embodiments, the display medium layer LC may include electrically controlled birefringence (ECB) liquid crystal molecules, vertical alignment (VA) liquid crystal molecules or other suitable liquid crystal molecules, which is not limited by the disclosure. The display medium layer LC may be formed between the substrate SB1 and the substrate SB2 by, for example, liquid crystal one drop fill (ODF), but the disclosure is not limited thereto.

The spacer PS is, for example, disposed between the substrate SB1 and the substrate SB2, and is used, for example, to support the substrate SB1 and the substrate SB2. In some embodiments, the spacer PS may be used to define a cell gap of the electronic device 10*a*. A material included in the spacer PS is not particularly limited, and may include, for example, organic photosensitive materials. In addition, the shape of the spacer PS is not particularly limited, and it may be, for example, columnar.

In the embodiment, the electronic device 10*a* further includes an alignment layer AL1 and an alignment layer AL2, where the alignment layer AL1 is disposed below the display medium layer LC, and the alignment layer AL2 is disposed above the display medium layer LC. From another perspective, the display medium layer LC is, for example, disposed between the alignment layer AL1 and the alignment layer AL2 in the normal direction N of the substrate SB1. The alignment layer AL1 and the alignment layer AL2 may, for example, be used to cause the display medium layer LC to have an alignment direction (i.e., the medium in the display medium layer LC has a pretilt angle). In detail, through the arrangement of the alignment layer AL1 and the alignment layer AL2, the liquid crystal molecules in the display medium layer LC may be, for example, arranged through changes in voltage. For example, when the electronic device 10*a* is not driven, the liquid crystal molecules in the display medium layer LC are arranged according to the alignment directions of the alignment layer AL1 and the alignment layer AL2. Comparatively, when the electronic device 10*a* is driven, the liquid crystal molecules in the display medium layer LC may have a corresponding tilt direction according to a voltage between the transparent conductive layer TL1 and the transparent conductive layer TL2. In some embodiments, materials of the alignment layer AL1 and the alignment layer AL2 may include polyimide, but the disclosure is not limited thereto. In some embodiments, the alignment direction of the display medium layer LC may be measured by using suitable electronic instruments such as a polarization meter and/or a phase difference measurement system, but the disclosure is not limited thereto.

In some embodiments, the electronic device 10*a* may further include an insulating layer OC. The insulating layer OC is, for example, disposed between the alignment layer AL2 and the second light-shielding layer BM in the normal direction N of the substrate SB1, so that the alignment layer AL2 may be stably disposed on the substrate SB2. A material of the insulating layer OC may be, for example, a transparent organic material, such as a photoresist material, but the disclosure is not limited thereto.

Figure 4:
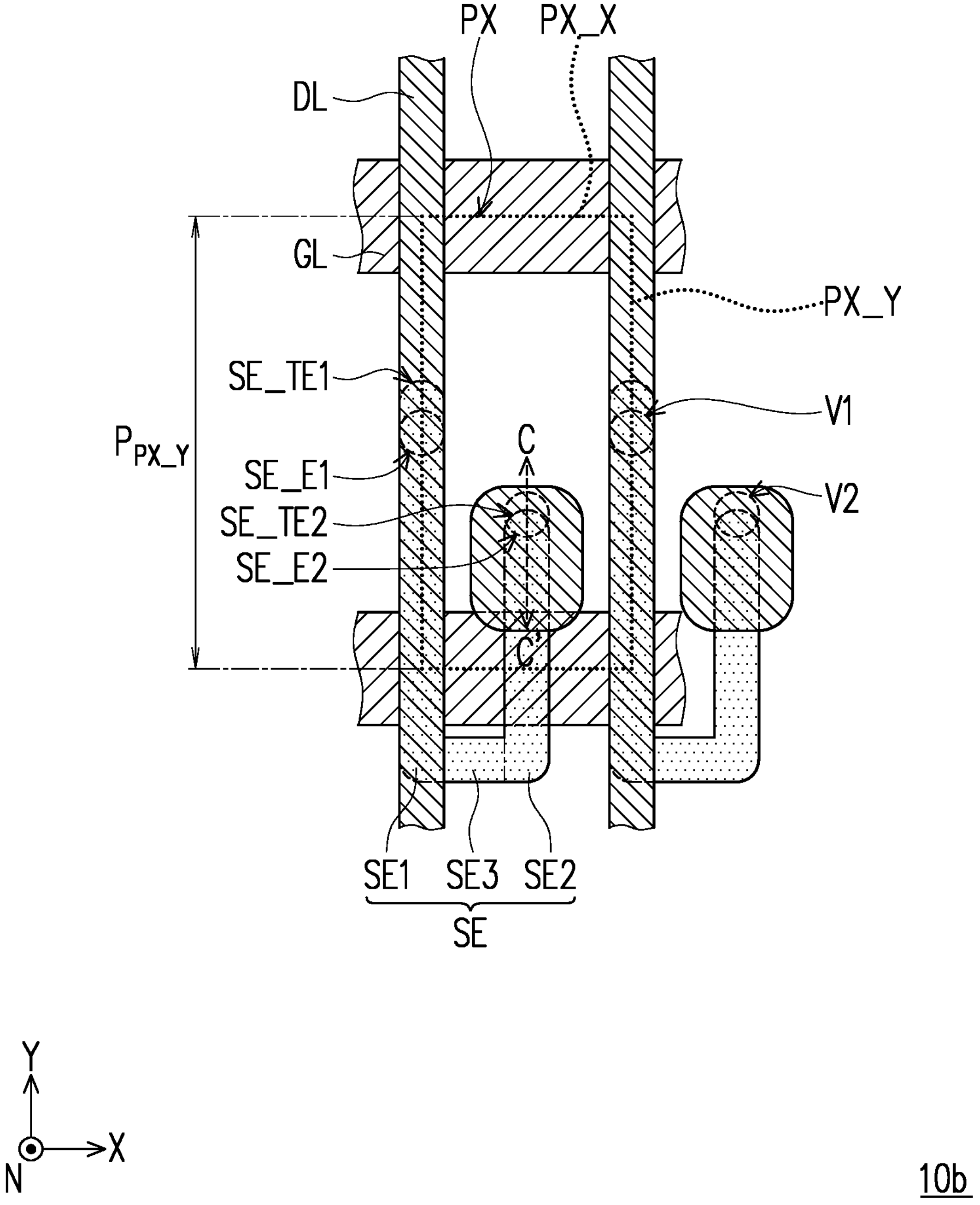
FIG. 4 is a schematic partial top view of an electronic device according to a second embodiment of the disclosure.
Figure 5:
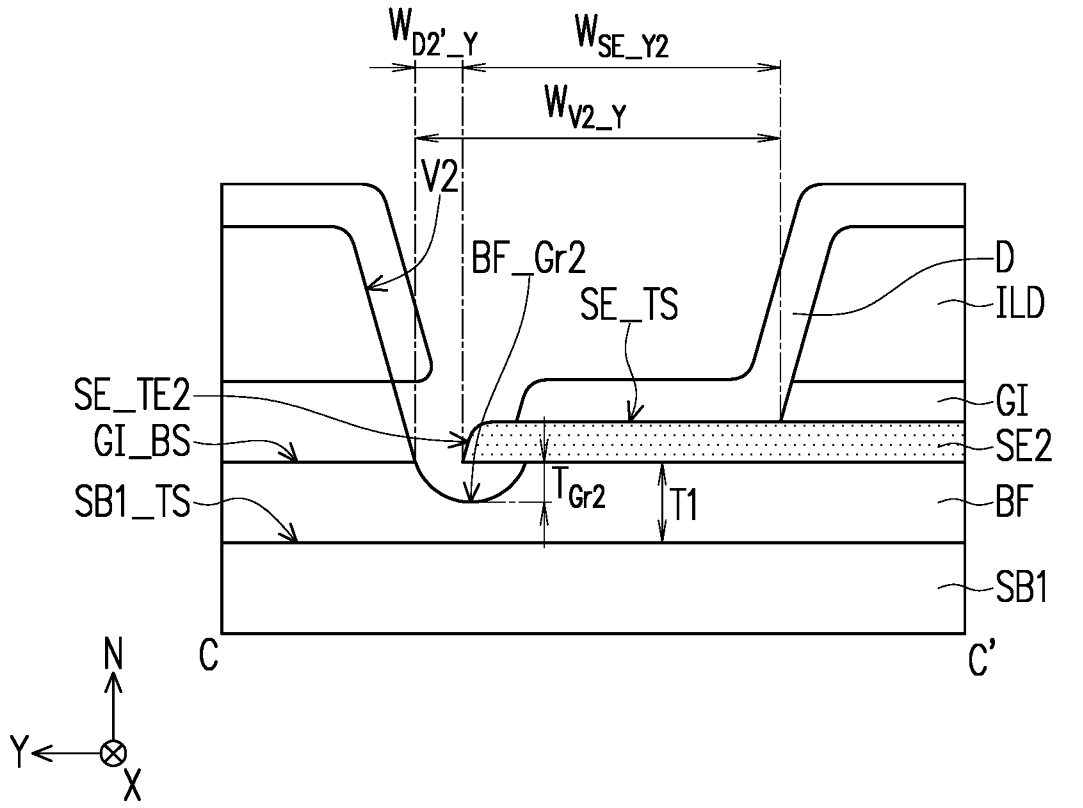
FIG. 5 is a schematic partial cross-sectional view of an embodiment based on a cross-section line C-C' of FIG. 4.

FIG. 4 is a schematic partial top view of an electronic device according to a second embodiment of the disclosure, and FIG. 5 is a schematic partial cross-sectional view of an embodiment based on a cross-section line C-C' of FIG. 4. It should be noted that reference numbers of the components and a part of contents of the embodiments of FIG. 1 and FIG. 3C are also used in the embodiment of FIG. 4 and FIG. 5, where the same reference numbers denote the same or like components, and descriptions of the same technical contents are omitted.

Referring to FIG. 4 and FIG. 5 at the same time, a main difference between an electronic device 10*b* and the above-mentioned electronic device 10*a* is that: corresponding to the edge SE_E2 of the semiconductor layer SE, the insulating layer BF further has a recess BF_Gr2, where the recess BF_Gr2 at least partially overlaps the hole V2 in the normal direction N of the substrate SB1.

In the embodiment, the recess BF_Gr2 of the insulating layer BF overlaps with the edge SE_E2 of the semiconductor layer SE. The edge SE_E2 here refers to an outer edge portion of the semiconductor layer SE corresponding to the hole V2 in the normal direction N of the substrate SB1. In detail, the recess BF_Gr2 of the insulating layer BF, for example, overlaps with a part of an outline of the edge SE_E2 of the semiconductor layer SE in the normal direction N of the substrate SB1, so that the semiconductor part SE2 may partially expose a part of the depression BF_Gr2 in the normal direction N of the substrate SB1. Namely, a part of the recess BF_Gr2 overlaps the semiconductor part SE2, and another part of the recess BF_Gr2 does not overlap the semiconductor part SE2. Based on this, when viewing in the top view direction of the electronic device 10*a* (opposite to the normal direction N of the substrate SB1), the hole V2 exposes a part of the edge SE_E2 of the semiconductor layer SE and also exposes a part of the insulating layer BF.

In some embodiments, the recess BF_Gr2 of the insulating layer BF has a minimum thickness $T_{Gr2}$, and there is a first distance T1 between the lower surface SE_BS of the semiconductor layer SE and the upper surface SB1_TS of the substrate SB1 (i.e., a thickness of the insulating layer BF in the normal direction N of the substrate SB1). In detail, the recess BF_Gr2 of the insulating layer BF does not expose the upper surface SB1_TS of the substrate SB1. Therefore, the minimum thickness TGr2 of the recess BF_Gr2 of the insulating layer BF is smaller than the first distance T1.

In some embodiments, the hole V2 and the semiconductor part SE2 may together expose a part of the recess BF_Gr2 of the insulating layer BF in the direction Y. In detail, in the embodiment, in the direction Y, a distance $W_{D2'\_Y}$ between the upper edge SE_TE2 of the semiconductor layer SE and the hole V2 and the width $W_{V2\_Y}$ of the hole V2 satisfy a following relational expression: $W_{D2'\_Y}<0.5*W_{V2\_Y}$, where the distance $W_{D2'\_Y}$ may be regarded as a size of a part of the recess BF_Gr2 close to the upper edge SE_TE2 of the semiconductor layer SE in the direction Y and exposed by the hole V2 and the semiconductor part SE2, and the width $W_{V2\_Y}$ of the hole V2 is a sum of the distance $W_{D2'\_Y}$ and a width $W_{SE\_Y2}$ of the semiconductor part SE2, but the disclosure is not limited thereto. Namely, as shown in FIG. 5, the hole V2 and the semiconductor part SE2 may together expose a part of the recess BF_Gr2 in the direction Y.

Therefore, the subsequently formed drain D may be in a discontinuous state. In details, referring to both FIG. 4 and FIG. 5, although the drain D is discontinuous in a portion close to the upper edge SE_TE2 of the semiconductor layer SE, the drain D of this portion may still be connected through the rest of the surrounding parts, i.e., the drain D of this portion may still be electrically connected to the semiconductor part SE2, thereby reducing the possibility of floating of the drain D.

Based on the above, by making the distance $W_{D2'\_Y}$ between the upper edge SE_TE2 of the semiconductor layer SE and the hole V2 and the width $W_{V2\_Y}$ of the hole V2 satisfying the above relational expression, the semiconductor part SE2 may be configured in the direction Y (the extending direction of the long side $P_{X\_Y}$ of the sub-pixel structure PX) to have a relatively small size, so that the electronic device 10*b* of the embodiment may include the sub-pixel structures PX with a relatively small size and achieve high resolution without affecting the operation of the active component TFT.

In addition, although not shown in FIG. 5, in the embodiment, the hole V2 may also expose the insulating layer BF under the semiconductor part SE2 in the direction X. Therefore, the semiconductor part SE2 may also be configured in the direction X (in the extending direction of the short side PX_X of the sub-pixel structure PX) to have a relatively small size.

Figure 6:
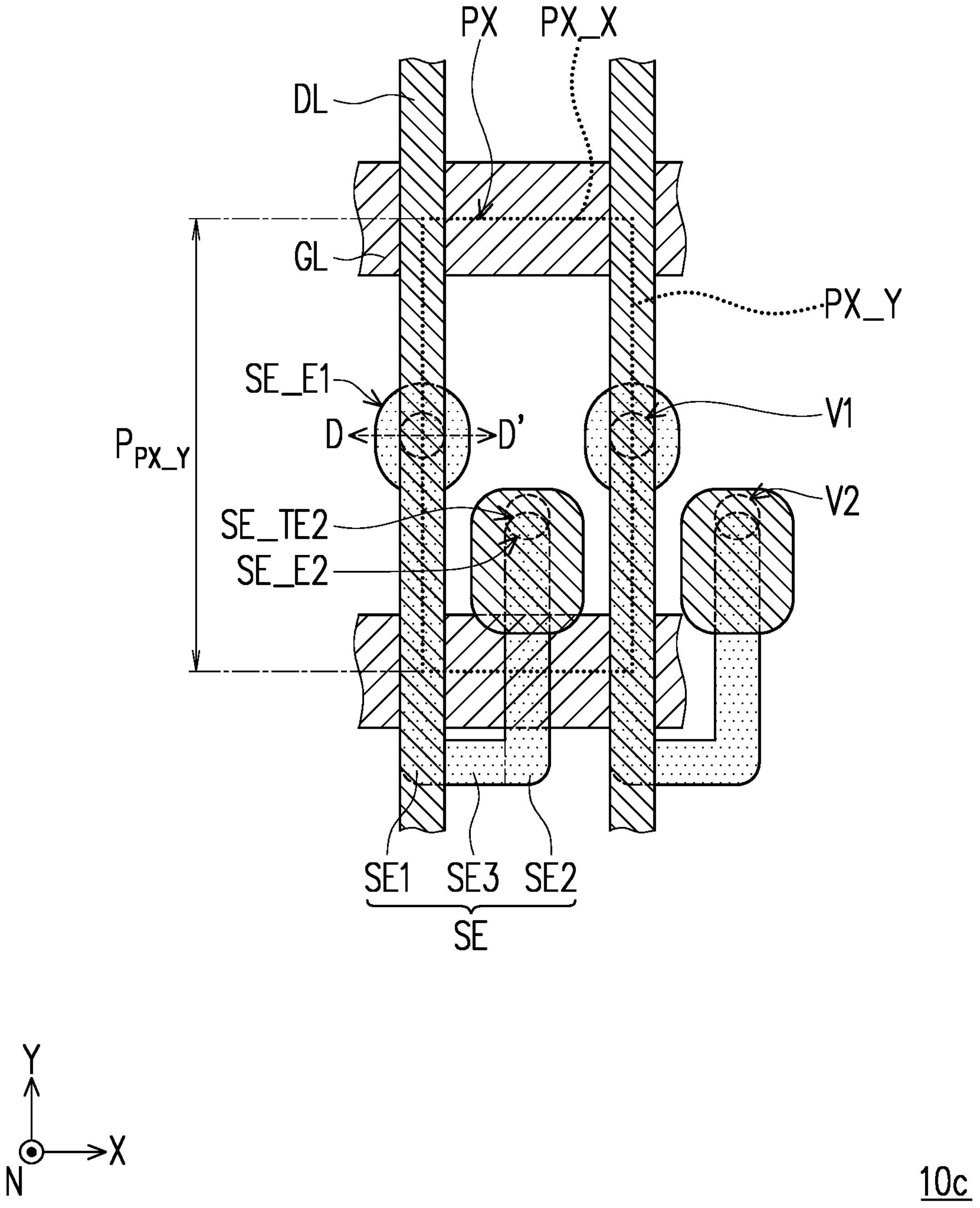
FIG. 6 is a schematic partial top view of an electronic device according to a third embodiment of the disclosure.
Figure 7:
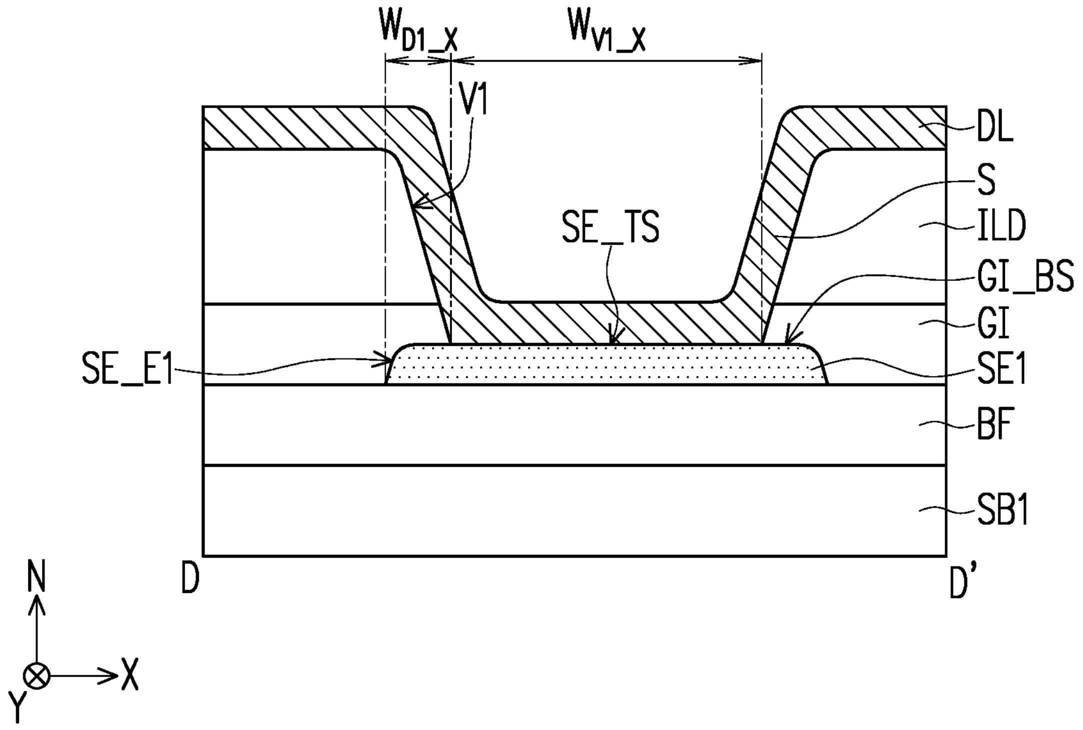
FIG. 7 is a schematic partial cross-sectional view of an embodiment based on a cross-section line D-D' of FIG. 6.

FIG. 6 is a schematic partial top view of an electronic device according to a third embodiment of the disclosure, and FIG. 7 is a schematic partial cross-sectional view of an embodiment based on a cross-section line D-D' of FIG. 6. It should be noted that reference numbers of the components and a part of contents of the embodiments of FIG. 4 and FIG. 5 are also used in the embodiment of FIG. 6 and FIG. 7, where the same reference numbers denote the same or like components, and descriptions of the same technical contents are omitted.

Referring to FIG. 6 and FIG. 7 at the same time, a main difference between an electronic device 10*c* and the above-mentioned electronic device 10*b* is that the insulating layer BF does not have a recess corresponding to the edge SE_E1 of the semiconductor layer SE.

In detail, the hole V1 overlaps the semiconductor part SE1 in the normal direction N of the substrate SB1, where a cross-sectional area of the semiconductor part SE1 in the normal direction N of the substrate SB1 may be larger than a cross-sectional area of the hole V1 in the normal direction N of the substrate SB1, Therefore, when performing the process of forming the hole V1, the semiconductor part SE1 serving as the etching stop layer may reduce the possibility of removing the insulating layer BF during the process.

In the embodiment, in the direction X, a distance $W_{D1\_X}$ between the edge SE_E1 of the semiconductor layer SE and the hole V1 and a width $W_{V1\_X}$ of the hole V1 satisfy the following relational expression: $0.1*W_{V1\_X}\leq W_{D1\_X}$, where the distance $W_{D1\_X}$ may be regarded as a size of a part of the semiconductor part SE1 close to the edge SE_E1 in the direction X and not exposed by the hole V1, but the disclosure is not limited thereto. Namely, as shown in FIG. 7, the semiconductor part SE1 has a portion that is not exposed by the hole V1 in the direction X, so that the semiconductor part SE1 may be configured in the direction X (the extending direction of the short side PX_X of the sub-pixel structure PX) to achieve a relatively large size, which reduces the possibility that the formed hole V1 exposes the insulating layer BF in the direction X, thereby reducing the problem of the source S in the hole V1 being open-circuited or short-circuited with the light-shielding layer LS.

It should be noted that the distance $W_{DL\_X}$ between the edge SE_E1 of the semiconductor layer SE and the hole V1 may be, for example, defined by the minimum width of the upper surface SE_TS of the semiconductor part SE1 close to the edge SE_E1 that is not exposed by the hole V1 in the direction X, and the width $W_{V1\_X}$ of the hole V1 may be defined, for example, by the width of the hole bottom in the direction X, but the disclosure is not limited thereto.

Figure 8:
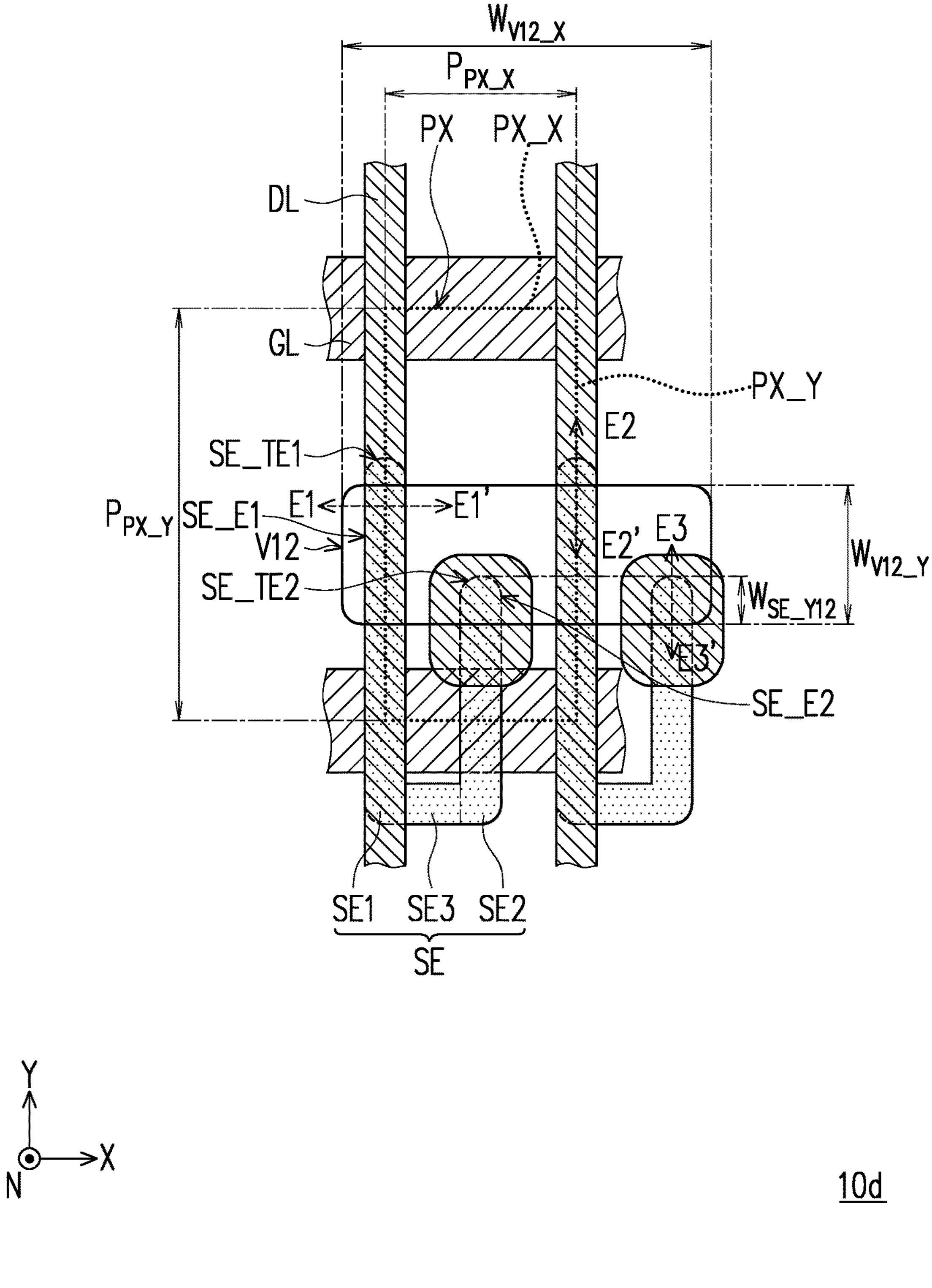
FIG. 8 is a schematic partial top view of an electronic device according to a fourth embodiment of the disclosure.
Figure 9A:
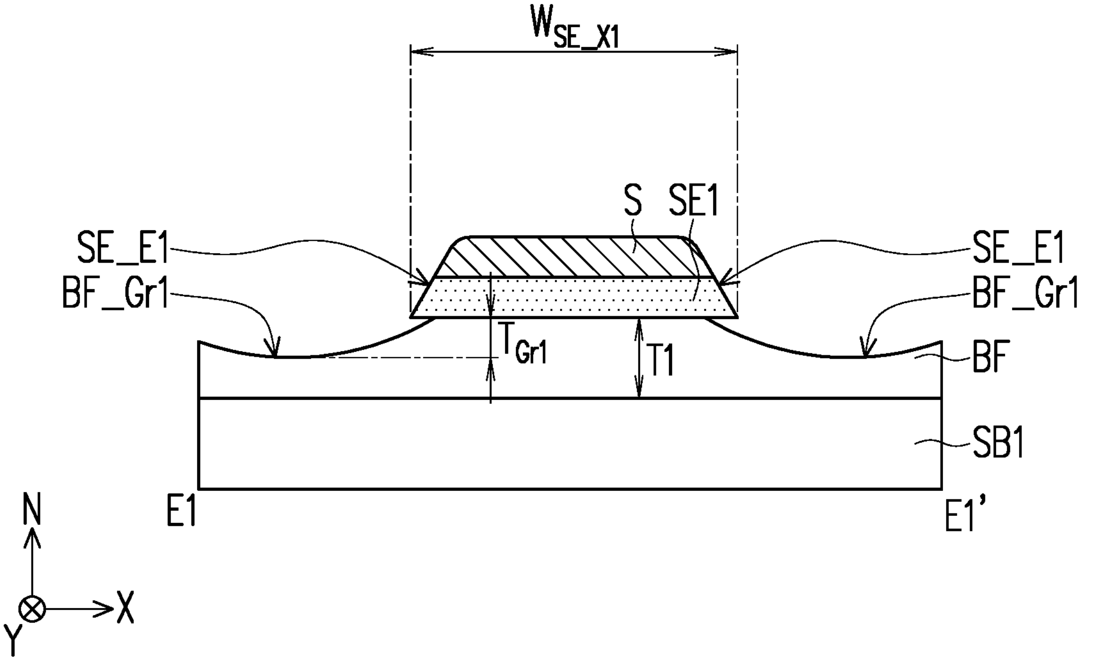
FIG. 9A is a schematic partial cross-sectional view of an embodiment based on a cross-section line E1-E1' of FIG. 8.
Figure 9B:
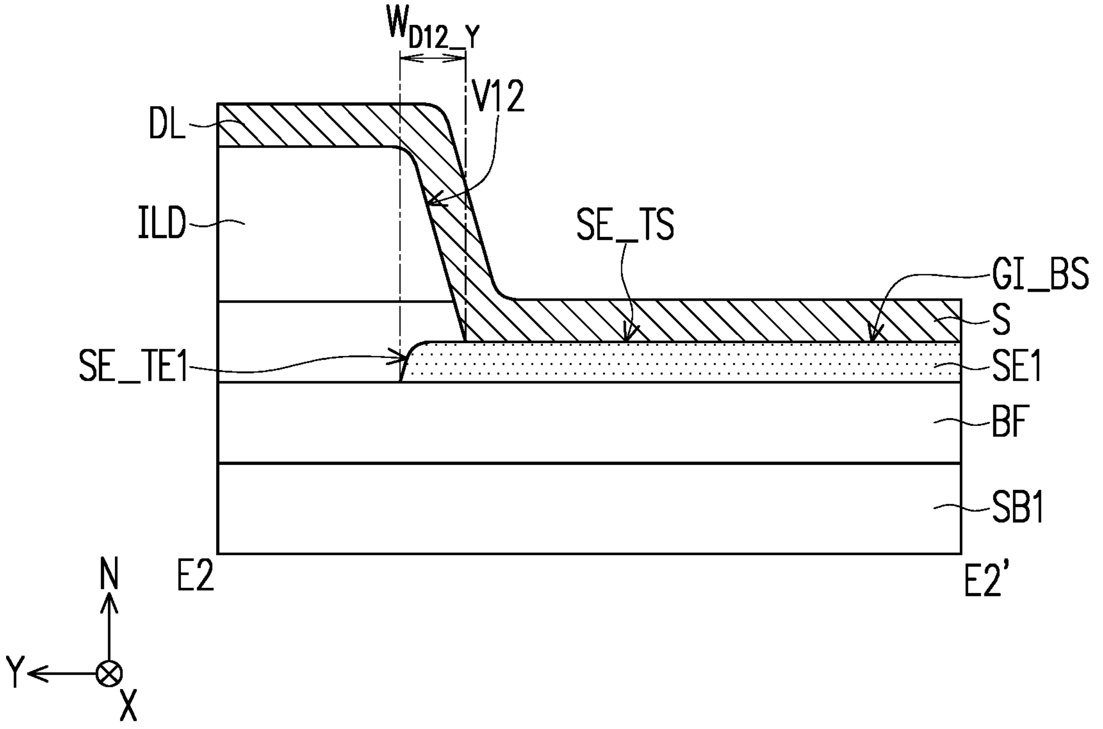
FIG. 9B is a schematic partial cross-sectional view of an embodiment based on a cross-section line E2-E2' of FIG. 8.
Figure 9C:
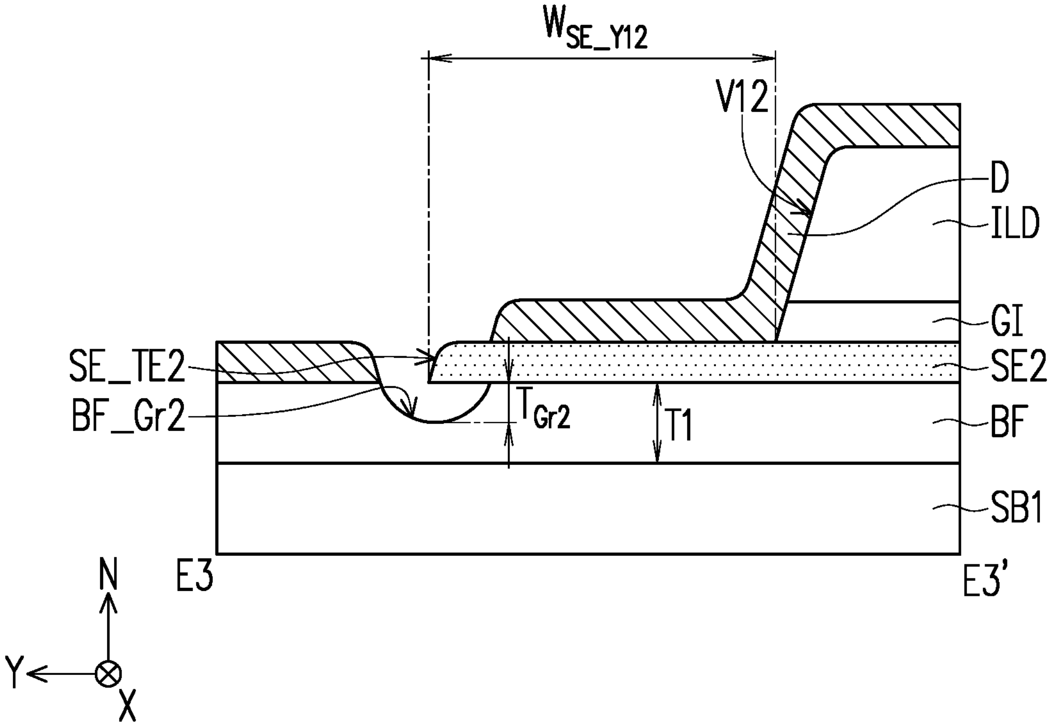
FIG. 9C is a schematic partial cross-sectional view of an embodiment based on a cross-section line E3-E3' of FIG. 8.

FIG. 8 is a schematic partial top view of an electronic device according to a fourth embodiment of the disclosure. FIG. 9A is a schematic partial cross-sectional view of an embodiment based on a cross-section line E1-E1' of FIG. 8, FIG. 9B is a schematic partial cross-sectional view of an embodiment based on a cross-section line E2-E2' of FIG. 8, and FIG. 9C is a schematic partial cross-sectional view of an embodiment based on a cross-section line E3-E3' of FIG. 8. It should be noted that reference numbers of the components and a part of contents of the embodiments of FIG. 1, FIG. 3A, FIG. 3B and FIG. 3C are also used in the embodiment of FIG. 8, FIG. 9A, FIG. 9B and FIG. 9C, where the same reference numbers denote the same or like components, and descriptions of the same technical contents are omitted.

Referring to FIG. 8, FIG. 9A, FIG. 9B and FIG. 9C at the same time, a main difference between an electronic device 10*d* and the above-mentioned electronic device 10*a* is that the electronic device 10*d* includes a hole V12, where the hole V12 expose the semiconductor layer SE of the plurality of sub-pixel structures PX.

In detail, a width $W_{V12\_X}$ of hole V12 in the direction X is, for example, larger than a width $P_{PX\_X}$ of the short side PX_X of the sub-pixel structure PX, so that the hole V12 may expose the semiconductor layer SE of the plurality of sub-pixel structures PX in the direction X. In the embodiment, the hole V12 exposes the semiconductor layer SE of two sub-pixel structures PX in the direction X, but the disclosure is not limited thereto.

In the embodiment, as shown in FIG. 9A, the hole V12 exposes a part of the semiconductor part SE1, and the hole V12 and the semiconductor layer SE may together expose a part of the recess BF_Gr1 of the insulating layer BF in the direction Y. Therefore, the subsequently formed source S may be in a discontinuous state. However, the data line DL may still be electrically connected to the semiconductor part SE1 through the source S. In detail, referring to FIG. 8 and FIG. 9A at the same time, although the source S is discontinuous in the portion close to the upper edge SE_TE1 of the semiconductor layer SE, the source S in this portion may still be connected through the rest of the surrounding parts, i.e., the source S of this portion may still be electrically connected to the semiconductor part SE1, thereby reducing the possibility of floating of the source S.

In the embodiment, in the direction Y, a distance $W_{D12\_Y}$ between the upper edge SE_TE1 of the semiconductor layer SE and the hole V12 and a width $W_{V12\_Y}$ of the hole V12 satisfy the following relational expression: $0.1*W_{V12\_Y} \leq W_{D12\_Y} < 0.5*P_{PX\_Y}$, where the distance $W_{D12\_Y}$ may be regarded as a size of a part of the semiconductor part SE1 close to the upper edge SE_TE1 in the direction Y and not exposed by the hole V12, and $P_{PX\_Y}$ may be regarded as a size (length) of the long side PX_Y of the sub-pixel structure PX, but the disclosure is not limited thereto. Namely, as shown in FIG. 9B, the semiconductor part SE1 has a portion that is not exposed by the hole V12 in the direction Y, so that the semiconductor part SE1 may be configured in the direction Y (the extending direction of the long side PX_Y of the sub-pixel structure PX) to have a relatively large size, which may reduce the possibility that the formed hole V12 exposes the insulating layer BF in the direction Y, thereby reducing the problem of the source S in the hole V1 being open-circuited or short-circuited with the light-shielding layer LS. In addition, by making the distance $W_{D12\_Y}$ (the size of the part of the semiconductor part SE1 close to the upper edge SE_TE1 in the direction Y and not exposed by the hole V1) smaller than the size of the long side PX_Y of the sub-pixel structure PX, the electronic device 10*d* of the embodiment may include the sub-pixel structures PX with a relatively small size and achieve a high resolution without affecting the operation of the active component TFT.

In the embodiment, the hole V12 and the semiconductor part SE2 may together expose a part of the recess BF_Gr2 of the insulating layer BF in the direction Y, as shown in FIG. 9C. Therefore, the subsequently formed drain D may be in a discontinuous state. However, the drain D may still be electrically connected to the semiconductor part SE2. In detail, referring to FIG. 8 and FIG. 9C at the same time, although the drain D is discontinuous in the portion close to the upper edge SE_TE2 of the semiconductor layer SE, the drain D in this portion may still be connected through the rest of the surrounding parts, i.e., the drain D of this portion may still be electrically connected to the semiconductor part SE2, thereby reducing the possibility of floating of the drain D.

In detail, in the embodiment, a width $W_{SE\_Y12}$ of the semiconductor layer SE corresponding to the hole V12 and the width $W_{V12\_Y}$ of the hole V12 satisfy the following relational expression: $W_{V12\_Y} - W_{SE\_Y12} < 0.5*W_{V12\_Y}$, where a difference between the width $W_{V12\_Y}$ and the width $W_{SE\_Y12}$ may be regarded as a width of a part of the recess BF_GR2 of the insulating layer BF exposed by the semiconductor part SE2 in the direction Y, but the disclosure is not limited thereto. By making the width $W_{SE\_X12}$ of the semiconductor part SE2 corresponding to the hole V12 and the width $W_{V12\_Y}$ of the hole V12 satisfy the above relational expression, the electronic device 10*d* of the embodiment may include the sub-pixel structures PX with a relatively small size and achieve a high resolution without affecting the operation of the active component TFT.

Figure 10:
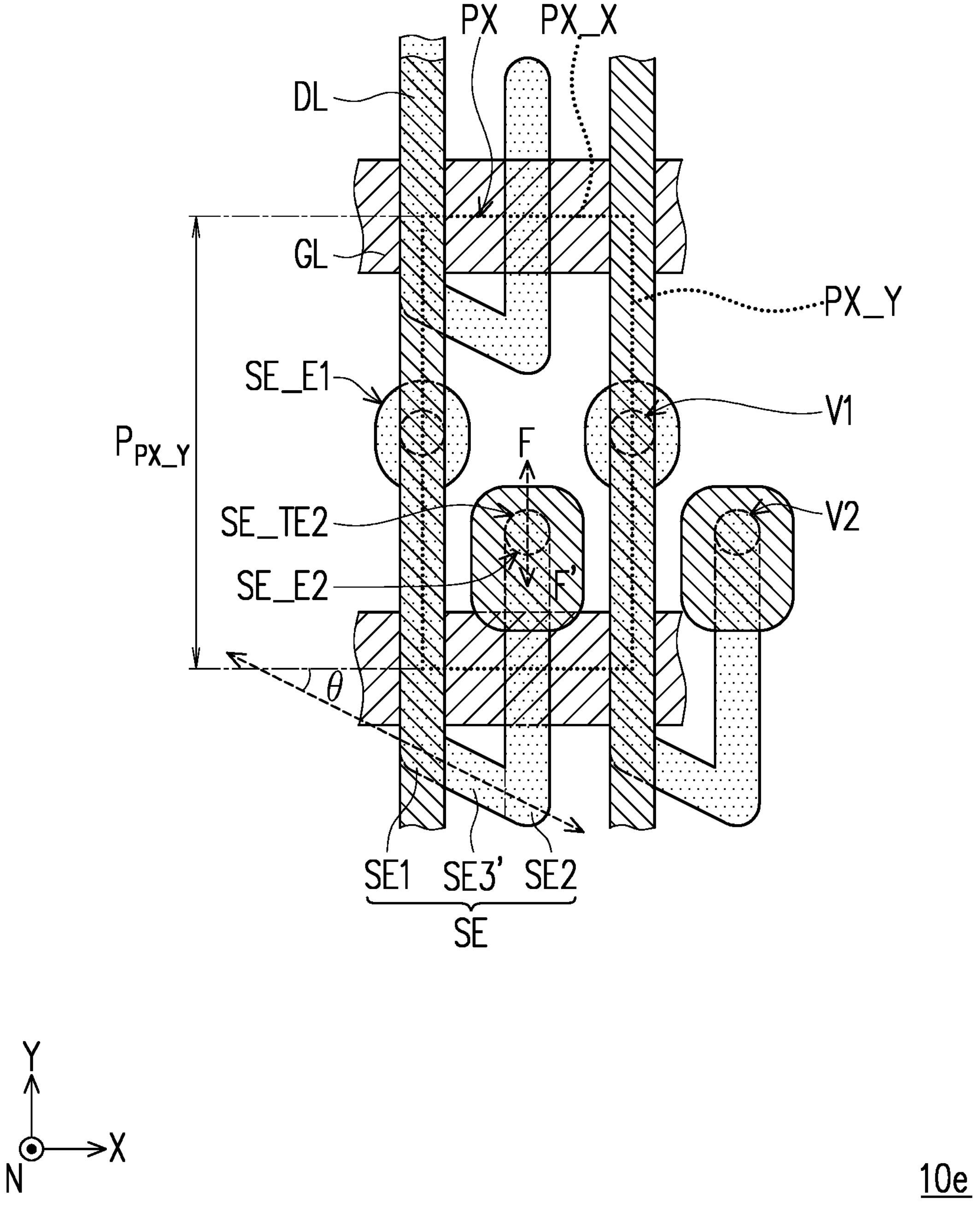
FIG. 10 is a schematic partial top view of an electronic device according to a fifth embodiment of the disclosure.
Figure 11:
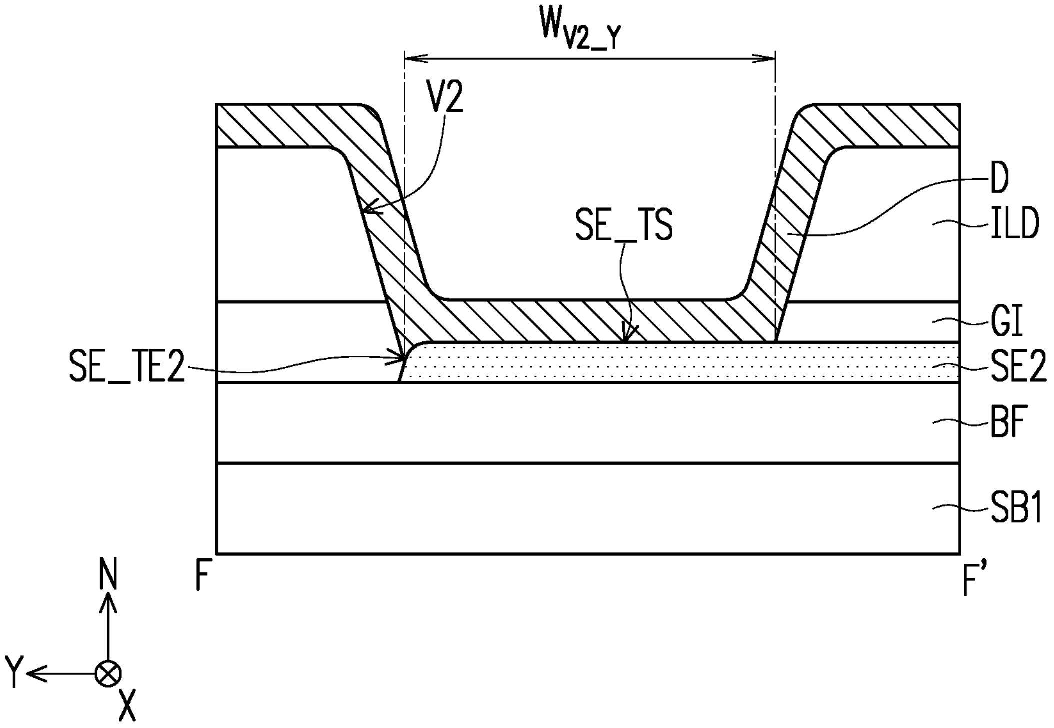
FIG. 11 is a schematic partial cross-sectional view of an embodiment based on a cross-section line F-F' of FIG. 10.

FIG. 10 is a schematic partial top view of an electronic device according to a fifth embodiment of the disclosure, and FIG. 11 is a schematic partial cross-sectional view of an embodiment based on a cross-section line F-F' of FIG. 10. It should be noted that reference numbers of the components and a part of contents of the embodiment of FIG. 6 and FIG. 7 are also used in the embodiment of FIG. 10 and FIG. 11, where the same reference numbers denote the same or like components, and descriptions of the same technical contents are omitted.

Referring to FIG. 10 and FIG. 11 at the same time, a main difference between an electronic device 10*e* and the above-mentioned electronic device 10*c* is that there is a non-zero included angle θ between an extending direction of a semiconductor part SE3' and an extending direction (direction X) of the gate line GL.

In detail, one end of the semiconductor part SE3' connected to the semiconductor part SE1 is closer to the gate line GL than the other end of the semiconductor part SE3' connected to the semiconductor part SE2. Therefore, there may be the non-zero included angle θ between the extending direction of the semiconductor part SE3' and the extending direction of the gate line GL.

Through the above design, the area of the adjacent sub-pixel structures PX occupied by the semiconductor part SE3' in the direction Y may be reduced, so that the semiconductor part SE1 of the adjacent sub-pixel structures PX may extend along the direction Y as much as possible. Therefore, the semiconductor part SE1 may be configured in the direction X (the extending direction of the short side PX_X of the sub-pixel structure PX) to have a relatively large size, which may reduce the possibility that the formed hole V1 exposes the insulating layer BF in the direction X, thereby reducing the problem of the source S in the hole V1 being open-circuited or being short-circuited with the light-shielding layer LS.

Figure 12:
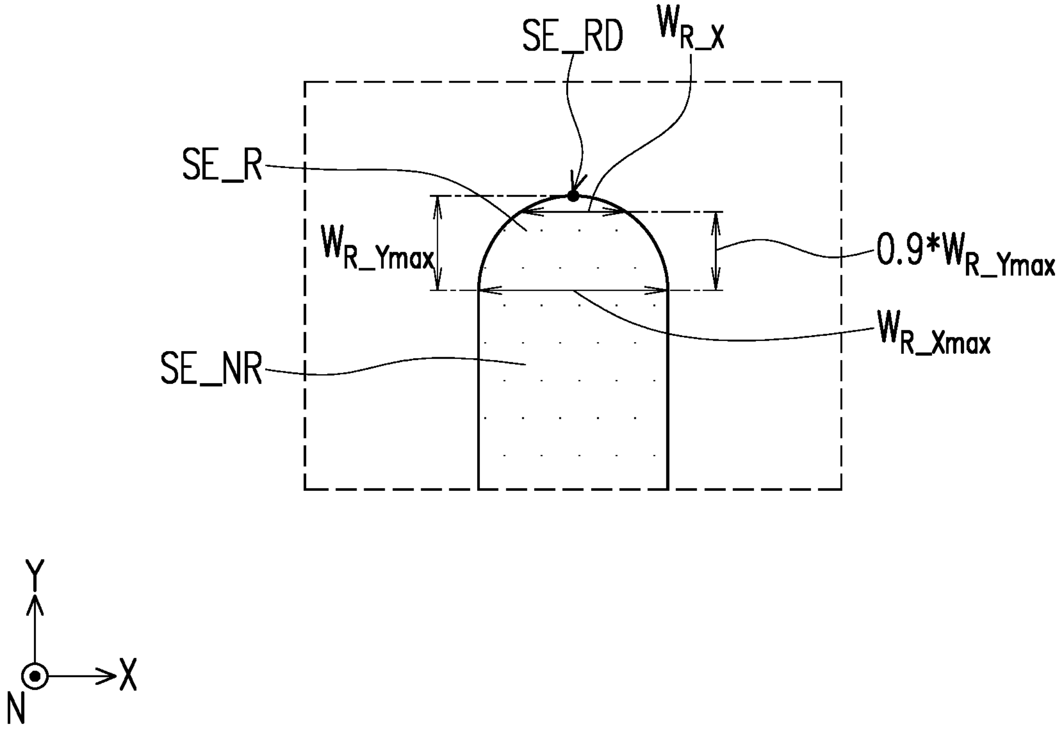
FIG. 12 is a schematic partially enlarged top view of an upper edge of a semiconductor layer of an electronic device according to an embodiment of the disclosure.

FIG. 12 is a schematic partially enlarged top view of an upper edge of a semiconductor layer of an electronic device according to an embodiment of the disclosure. It should be noted that reference numbers of the components and a part of contents of the embodiment of FIG. 1 are also used in the embodiment FIG. 12, where the same reference numbers denote the same or like components, and descriptions of the same technical contents are omitted.

Referring to FIG. 1 and FIG. 12 at the same time, the upper edge SE_TE1 of the semiconductor layer SE may, for example, have an arc-shaped outline, so that the semiconductor part SE1 may have a rounded corner portion SE_R. The rounded corner portion SE_R of the semiconductor part SE1 may be, for example, located in the hole V1, which may, for example, expose the recess BF_Gr1 of the insulating layer BF together with the hole V1. In addition, although not shown in FIG. 12, the upper edge SE_TE2 of the semiconductor layer SE may also have an arc-shaped outline, i.e., the semiconductor part SE2 may also have a rounded corner portion.

The rounded corner portion SE_R of the semiconductor part SE1 has, for example, a maximum width $W_{R\_Xmax}$ in the direction X, and has, for example, a maximum width $W_{R\_Ymax}$ in the direction Y, where the maximum width $W_{R\_Ymax}$ is, for example, a distance between an end point SE_RD in the rounded corner portion SE_R of the semiconductor part SE1 and an end point of a non-rounded corner portion SE_NR in the direction Y, or the maximum width $W_{R\_Ymax}$ is, for example, a distance from a point where the width of the semiconductor part SE1 in the Y direction (a width measured along the X direction) starts to decrease to the end point SE_RD. In the embodiment, at a position where the end point SE_RD in the rounded corner portion SE_R of the semiconductor part SE1 extends by a distance of $0.1*W_{R\_Ymax}$ ($W_{R\_Ymax}-0.9*W_{R\_Ymax}$) in a direction opposite to the direction Y, the rounded corner portion SE_R of the semiconductor part SE1 has a width $W_{R\_X}$ in the direction X that satisfies the following relational expression:

$$W_{R\_X} > 0.1 * W_{R\_Xmax}.$$

Through the above design, the semiconductor part SE1 exposed by the hole V1 may still have a relatively large width in the direction Y, so that the source S formed in the hole V1 may still be electrically connected to the semiconductor part SE1 exposed by the hole V1, thereby reducing the problem of the source S in the hole V1 being open-circuited or short-circuited with the light-shielding layer LS.

In summary, in the electronic device provided by some embodiments of the disclosure, the semiconductor layer has a portion that is not exposed by the hole in the extending direction of the data line (direction Y), so that the semiconductor layer may be configured in the extending direction of the data line to have a relatively large size of, which may reduce the possibility that the hole exposes the insulating layer located below the semiconductor layer in the extending direction of the data line, thereby reducing the problem of the source and/or the drain in the hole being open-circuited and/or being short-circuited with the light-shielding layer LS.

Furthermore, in the electronic device provided by other embodiments of the disclosure, the size of the semiconductor layer in the extending direction of the gate line (direction X) is smaller than the size of the hole in the extending direction of the gate line, and conforms to the aforementioned corresponding relational expressions, so that the semiconductor layer may be configured in the extending direction of the gate line to have a relatively small size, thereby the electronic device of the embodiment may include the sub-pixel structures with a relatively small size and achieve high resolution.

What is claimed is:

1. An electronic device, comprising:

a substrate;

a first insulating layer, disposed on the substrate;

a semiconductor layer, disposed on the first insulating layer;

a second insulating layer, disposed on the semiconductor layer and having a first hole; and a data line, disposed on the substrate, and the data line being electrically connected to the semiconductor layer through the first hole, wherein corresponding to an edge of the semiconductor layer, the first insulating layer has a recess, wherein the recess overlaps the edge of the semiconductor layer.

2. The electronic device as claimed in claim 1, wherein a part of the recess of the first insulating layer has a first minimum thickness, a lower surface of the semiconductor layer and an upper surface of the substrate have a first distance there between, and the first minimum thickness is less than the first distance.

3. The electronic device as claimed in claim 1, wherein viewing from a top view direction of the electronic device, the first hole exposes a part of the edge of the semiconductor layer.

4. The electronic device as claimed in claim 3, wherein the data line extends along a first direction, and in a second direction perpendicular to the first direction, a width of the semiconductor layer corresponding to the first hole is smaller than a width of the first hole.

5. The electronic device as claimed in claim 1, further comprising a drain, wherein the second insulating layer further comprises a second hole, the drain is disposed on the semiconductor layer, and the drain is electrically connected to the semiconductor layer through the second hole, and the second hole exposes a part of the first insulating layer.

6. The electronic device as claimed in claim 5, wherein a part of the first insulating layer overlapping the second hole has another recess.

7. The electronic device as claimed in claim 1, wherein the semiconductor layer comprises a first semiconductor part, a second semiconductor part and a third semiconductor part, the third semiconductor part connects the first semiconductor part and the second semiconductor part, the first semiconductor part and the second semiconductor part extends in a first direction, and the third semiconductor part extends in a second direction.

8. The electronic device as claimed in claim 7, further comprising a gate line, wherein an extending direction of the third semiconductor part and an extending direction of the gate line have a non-zero included angle there between.

9. The electronic device as claimed in claim 7, wherein a length of the first semiconductor part in the first direction is greater than a length of the second semiconductor part in the first direction.

10. The electronic device as claimed in claim 7, wherein a width of the first semiconductor part corresponding to the first hole is smaller than a width of the first hole.

11. The electronic device as claimed in claim 10, wherein the width of the first semiconductor part corresponding to the first hole and the width of the first hole satisfy a following relational expression: $(W_{V1\_X}-W_{SE\_X1})/2<0.5*W_{V1\_X}$, wherein $W_{V1\_X}$ is the width of the first hole, and $W_{SE\_X1}$ is the width of the first semiconductor portion corresponding to the first hole.

12. The electronic device as claimed in claim 7, wherein a distance between the edge of the semiconductor layer and the first hole and a width of the first hole satisfy a following relational expression: $0.1*W_{V1\_X}\leq W_{D1\_X}$, wherein $W_{V1\_X}$ is the width of the first hole, and $W_{D1\_X}$ is the distance between the edge of the semiconductor layer and the first hole.

13. The electronic device as claimed in claim 7, wherein viewing from a top view direction of the electronic device, the first hole does not expose the edge of the semiconductor layer.

14. The electronic device as claimed in claim 13, wherein a distance between the edge of the semiconductor layer and the first hole and a width of the first hole satisfy a following relational expression: $0.1*W_{V1\_X} \leq W_{D1\_X}$, wherein $W_{V1\_X}$ is the width of the first hole, and $W_{D1\_X}$ is the distance between the edge of the semiconductor layer and the first hole.

15. The electronic device as claimed in claim 7, wherein the first semiconductor part and the second semiconductor part respectively have a rounded corner portion and a non-rounded corner portion.

16. The electronic device as claimed in claim 12, wherein the rounded corner portion is located in the first hole, and the rounded corner portion and the first hole together expose the recess of the first insulating layer.

17. An electronic device, comprising:

a substrate;

a first insulating layer, disposed on the substrate;

a semiconductor layer, disposed on the first insulating layer;

a second insulating layer, disposed on the semiconductor layer and having a first hole;

a data line, disposed on the substrate, and the data line being electrically connected to the semiconductor layer through the first hole;

a plurality of gate lines, extending in a second direction; and a plurality of data lines extending in a first direction, wherein two adjacent gate lines and two adjacent data lines define a sub-pixel structure, wherein corresponding to an edge of the semiconductor layer, the first insulating layer has a recess.

18. The electronic device as claimed in claim 17, wherein the first hole exposes the semiconductor layer in the plurality of sub-pixel structures.

19. An electronic device, comprising:

a substrate;

a first insulating layer, disposed on the substrate;

a semiconductor layer, disposed on the first insulating layer;

a second insulating layer, disposed on the semiconductor layer and having a first hole; and a data line, disposed on the substrate, and the data line being electrically connected to the semiconductor layer through the first hole, wherein corresponding to an edge of the semiconductor layer, the first insulating layer has a recess, wherein a part of the recess overlaps the semiconductor layer, and another part of the recess does not overlap the semiconductor layer.

* * * * *